US012491513B2

(12) United States Patent
El Fajri et al.

(10) Patent No.: US 12,491,513 B2
(45) Date of Patent: Dec. 9, 2025

(54) MICROFLUIDIC STRUCTURES WITH INTERIOR PILLARS

(71) Applicant: Hewlett-Packard Development Company, L.P., Spring, TX (US)

(72) Inventors: Oumnia El Fajri, Corvallis, OR (US); Richard W. Seaver, Corvallis, OR (US); Erik D. Torniainen, Corvallis, OR (US); Anand Samuel Jebakumar, Corvallis, OR (US); Pavel Kornilovich, Corvallis, OR (US); Alexander Govyadinov, Corvallis, OR (US); Carson Denison, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 824 days.

(21) Appl. No.: 17/721,724

(22) Filed: Apr. 15, 2022

(65) Prior Publication Data

US 2023/0330675 A1 Oct. 19, 2023

(51) Int. Cl.
*B01L 3/00* (2006.01)

(52) U.S. Cl.
CPC ... *B01L 3/50273* (2013.01); *B01L 2300/0874* (2013.01); *B01L 2300/0887* (2013.01); *B01L 2400/0406* (2013.01)

(58) Field of Classification Search
None
See application file for complete search history.

(56) References Cited

U.S. PATENT DOCUMENTS

| | | | | |
|---|---|---|---|---|
| 6,599,736 | B2 | 7/2003 | McCaskill et al. | |
| 11,110,453 | B2 | 9/2021 | Govyadinov et al. | |
| 2007/0048192 | A1* | 3/2007 | Kartalov et al. | F16K 99/003 422/400 |
| 2007/0072290 | A1* | 3/2007 | Hvichia | C12M 47/04 435/308.1 |
| 2014/0271909 | A1* | 9/2014 | Hvichia | G01N 15/0272 435/308.1 |

(Continued)

FOREIGN PATENT DOCUMENTS

WO WO 9909042 A2 * 2/1999 ............... C01H 1/00

OTHER PUBLICATIONS

Atencia and Beebe, Controlled Microfluidic Interfaces, Nature vol. 437, pp. 648-655 (2005) (Year: 2005).*

(Continued)

*Primary Examiner* — Maris R Kessel
*Assistant Examiner* — Madison Taylor Herbert
(74) *Attorney, Agent, or Firm* — Foley & Lardner LLP

(57) ABSTRACT

An example microfluidic structure can include a first microfluidic channel segment in a first elevation plane, a second microfluidic channel segment in a second elevation plane, and a transverse microfluidic channel segment connecting the first microfluidic channel segment to the second microfluidic channel segment. An interior pillar can be positioned at the transverse microfluidic channel segment. The interior pillar can have a tapered downstream edge. The tapered downstream edge can be angled in the first or second elevation plane at an acute angle. A fluid cross-sectional area can increase in the fluid flow direction along the tapered downstream edge.

10 Claims, 7 Drawing Sheets

(56) References Cited

U.S. PATENT DOCUMENTS

| | | | |
|---|---|---|---|
| 2018/0304266 A1 | 10/2018 | Jones | |
| 2020/0406258 A1* | 12/2020 | Govyadinov et al. | B01L 3/502723 |

OTHER PUBLICATIONS

Cosson et al., Ultra-rapid prototyping of flexible, multi-layered microfluidic devices via razor writing, Lap on a Chip, The Royal Society of Chemistry 2014, 5 pages.
He et al., "Overpass" at the junction of a crossed microchannel: An enabler for 3D microfluidic chips; Lab on a Chip, The Royal Society of Chemistry 2012, 4 pages.
Liu, Integrated Microfluidic Devices for Cell Culture and Assay, California Institute of Technology, 2010, 167 pages.

* cited by examiner

MICROFLUIDIC STRUCTURES WITH INTERIOR PILLARS

BACKGROUND

Microfluidics relates to the behavior, control and manipulation of fluids that are geometrically constrained to a small, typically sub-millimeter, scale. Numerous applications employ passive fluid control techniques such as capillary forces. Capillary action refers to the spontaneous wicking of fluids into narrow channels without the application of external forces. In other applications, external actuation techniques are employed for a directed transport of fluid. A variety of applications for microfluidics exist, with various applications using differing controls over fluid flow, mixing, temperature, evaporation, and so on.

BRIEF DESCRIPTION OF THE DRAWINGS

Additional features of the disclosure will be apparent from the detailed description which follows, taken in conjunction with the accompanying drawings, which together illustrate, by way of example, features of the present technology.

Figure 1:
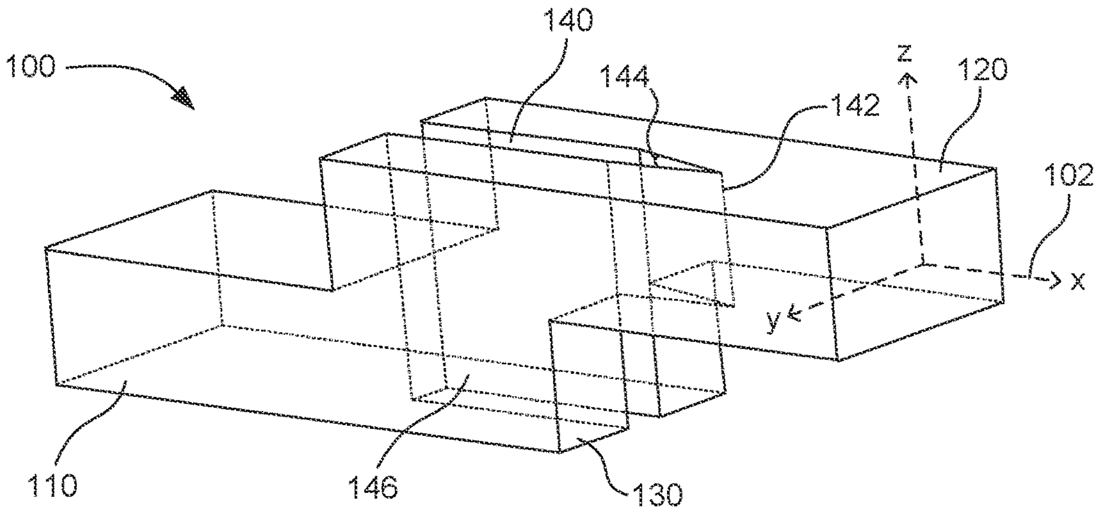
FIG. 1 is a perspective view of an example microfluidic structure in accordance with the present disclosure; (one pillar with a flat front end and tapered back end)

Reference will now be made to several examples that are illustrated herein, and specific language will be used herein to describe the same. It will nevertheless be understood that no limitation of the scope of the disclosure is thereby intended.

DETAILED DESCRIPTION

The present disclosure describes microfluidic structures that can be primed with fluid by capillary action. The particular microfluidic structures described herein can include a microfluidic channel segment that transitions from a first elevation to a second elevation while avoiding trapping fluid or air bubbles at corners or bends in the microfluidic channel segment. In some examples, these microfluidic structures can be used to make microfluidic overpasses that allow one microfluidic channel to cross over another microfluidic channel.

In one example, a microfluidic structure includes a first microfluidic channel segment in a first elevation plane, a second microfluidic channel segment in a second elevation plane, and a transverse microfluidic channel segment connecting the first microfluidic channel segment to the second microfluidic channel segment. An interior pillar is positioned at the transverse microfluidic channel segment. The interior pillar has a tapered downstream edge. The tapered downstream edge is angled in the first or second elevation plane at an acute angle, and a fluid cross-sectional area increases in the fluid flow direction along the tapered downstream edge. In some examples, a portion of the interior pillar can be within the transverse microfluidic channel segment and the tapered downstream edge can be within the second microfluidic channel segment. In certain examples, the portion of the interior pillar within the transverse microfluidic channel segment can include faces that are parallel to the fluid flow direction. The interior pillar may also include a tapered upstream edge. In some examples, the tapered pillar can be diamond shaped. The acute angle of the tapered downstream edge can be from 5° to 45°. In further examples, the first microfluidic channel segment can be formed in a first layer of a photoresist material in the first elevation plane and the second microfluidic channel segment can be formed in a second layer of photoresist material in the second elevation plane. The microfluidic structure can also include an intermediate layer of photoresist material between the first layer of photoresist material and the second layer of photoresist material. A portion of the transverse microfluidic channel segment can be formed in the intermediate layer of photoresist material. In certain examples, the microfluidic structure can also include an angled exterior wall segment at the transverse microfluidic channel segment. The angled exterior wall segment can be angled in the first or second elevation plane at an acute angle with respect to a direction of fluid flow through the first or second microfluidic channel segment.

The present disclosure also describes microfluidic overpasses. In one example, a microfluidic overpass includes a first microfluidic channel segment in a first elevation plane, a second microfluidic channel segment in a second elevation plane, and a transverse microfluidic channel segment connecting the first microfluidic channel segment to the second microfluidic channel segment. An interior pillar is positioned at the transverse microfluidic channel segment. The interior pillar has a tapered downstream edge. The tapered downstream edge is angled in the first or second elevation plane at an acute angle. The microfluidic overpass also includes a microfluidic cross-channel that is fluidly separate from the first microfluidic channel segment, the second microfluidic channel segment, and the transverse microfluidic channel segment. The microfluidic cross-channel either crosses the first microfluidic channel segment in the second elevation plane, or crosses the second microfluidic channel segment in the first elevation plane. In some examples, the first microfluidic channel segment can be formed in a first layer of photoresist material in the first elevation plane and the second microfluidic channel segment can be formed in a second layer of photoresist material in the second elevation plane. The microfluidic cross-channel can be formed in the first layer of photoresist material or the second layer of photoresist material. The microfluidic overpass can also include an intermediate layer of photoresist material between the first layer of photoresist material and the second layer of photoresist material. A portion of the transverse microfluidic channel segment can be formed in the intermediate layer of photoresist material, and the intermediate layer of photoresist material can fluidly separate the microfluidic cross-channel from the channel segment that is crossed by the microfluidic cross-channel.

The present disclosure also describes methods of priming a microfluidic structure. In one example, a method of priming a microfluidic structure includes introducing a fluid into a first microfluidic channel segment in a first elevation plane; flowing the fluid through the first microfluidic channel segment and into a second microfluidic channel segment in a second elevation plane through a transverse microfluidic channel segment connecting the first microfluidic channel segment to the second microfluidic channel segment, wherein the flowing is by capillary action; wherein an interior pillar is positioned at the transverse microfluidic channel segment, the interior pillar having a tapered downstream edge, wherein the tapered downstream edge is angled in the first or second elevation plane at an acute angle. In some examples, the first microfluidic channel segment can be formed in a first layer of photoresist material in the first elevation plane and the second microfluidic channel segment can be formed in a second layer of photoresist material in the second elevation plane. The fluid can have a contact angle greater than 70° with the photoresist material. The fluid can include pure water, reagent, a biological component, a surfactant-free dispersion, or a combination thereof.

The microfluidic structures and microfluidic overpasses described herein can be incorporated into a variety of microfluidic devices. Microfluidic devices are widely used in life sciences and other applications. These devices typically include small microfluidic flow channels having dimensions on the μm-scale, such as channels having a width or height of less than 100 μm, or less than 50 μm, or less than 20 μm, in various examples. At such small scales, certain forces such as adhesive and cohesive forces can become more significant compared to larger scales. For example, the behavior of water in microfluidic channels can be largely dictated by the adhesive forces of the water adhering to hydrophilic solid surfaces, and by the cohesive forces between water molecules, which may manifest as surface tension. Because the volume of water within a small microfluidic channel can be very small, the forces of gravity on the water may be less significant or negligible compared to adhesive and cohesive forces. When the solid wall surfaces of a microfluidic channel are hydrophilic, the adhesive forces between water and the microfluidic channel walls can cause water to spontaneously flow into the microfluidic channel by capillary action. This can occur regardless of the orientation of the microfluidic device, since the force of gravity on the water may be negligible.

When a solid material has a strong adhesion with water, the solid material can be said to have a low contact angle with water. The contact angle refers to the angle between a solid surface and a surface of a water droplet at the interface between the droplet surface and the solid surface. When the solid material is more hydrophilic, the contact angle becomes more acute because the water droplet tends to spread out over the surface more. Solid materials that have a contact angle with water of less than 90° are considered to be hydrophilic, and materials that have a contact angle with water greater than 90° are considered to be hydrophobic. The contact angle between a fluid and a solid material can depend on both the fluid and the solid material. For example, a particular solid material may have a higher contact angle with pure water, but a lower contact with water that has a wetting agent added.

Some microfluidic devices can be manufactured and packaged in a dry state. In this state, microfluidic channels within the device may contain air instead of liquid. When the device is used, the microfluidic channels can be primed, meaning a liquid can be introduced into the microfluidic channels. It can be useful to prime the microfluidic channels by using capillary action instead of an external force such as a pump to force the liquid into the microfluidic channels. In order for the microfluidic channels to be capable of self-priming by capillary action, the microfluidic channels can be designed so that the adhesive forces between the liquid and the walls of the microfluidic channels overcomes the cohesive forces between water molecules. In other words, the liquid will preferentially continue to flow through the microfluidic channels because of the adhesive attraction to the walls of the channels instead of being held stationary by cohesive forces such as surface tension.

In some cases, any sudden increases in the cross-sectional area of a microfluidic channel may potentially cause the capillary action to stop, because the cohesive forces of the liquid will tend to prevent the liquid-air interface (i.e., the meniscus) from growing to fill the larger cross-section. A sudden increase in the cross-sectional area of the channel can cause the meniscus to become convex, which can create a positive capillary pressure and stop fluid advancement. One type of feature that can cause such a break in capillary action is a sharp turn in a microfluidic channel, such as a 90° bend. When liquid flows around a 90° bend, the meniscus may temporarily become convex as the effective cross-section of the channel increases at the corner of the bend. If the contact angle between the liquid and the channel walls is sufficiently low, then capillary action can continue around such a bend without issue. For example, if the contact angle is 60° or less, then the liquid can typically flow around a 90° bend by capillary action without interruption. However, if the contact angle is 70° or greater, then the liquid is likely to become stuck at the 90° bend and will not flow by capillary action around the bend.

Many microfluidic devices can include multiple microfluidic channels that may carry multiple different liquids. One method of manufacturing such a microfluidic devise involves forming the microfluidic channels in a flat layer of material, such as a layer of photoresist. The various microfluidic channels and other microfluidic structures can be made by patterning and developing the layer of photoresist. This type of manufacturing process allows for a high level control over the shape of the microfluidic channels in two dimensions. However, this process does not allow full control of the shape in the third dimension, which is the height or elevation dimension (i.e., up and down). Additional layers of photoresist material can be deposited over the top of the first layer of photoresist. These additional layers can include differently shaped and located microfluidic channels and other structures. Thus, this provides some control over the shape of microfluidic structures in the height dimension, but full control over the height may not be available with this manufacturing process. This can be referred to as a "2.5 dimensional process."

A single layer of photoresist material can be used to form many microfluidic features. However, it can be difficult to route multiple fluids in a single plane of a single layer of photoresist material. It can be particularly difficult to form an overpass that allows one microfluidic channel to cross over another channel. In some cases, microfluidic overpasses can be made by stacking several layers of photoresist with varying microfluidic channel shapes. For example, two separate channel segments can be formed in a bottom layer, and an overpass channel segment can be formed in a top layer such that the overpass channel segment connects the lower channel segments when the layers are stacked. An intermediate layer can also be added that has transverse channel segments to connect the lower layer channel segments to the overpass channel segment. Such a microfluidic overpass can function well in some applications, but these microfluidic overpass structures include sharp angles at or near 90° for the bends between the lower layer channel segments, the transverse channel segments, and the overpass channel segment. The 2.5-dimensional manufacturing process does not allow for smooth curved transitions in such overpass structures. Therefore, higher contact angle fluids may become trapped and pinned at these sharp turns. Air bubbles can also tend to be trapped at such sharp turns.

The present disclosure describes new designs for microfluidic structures that can include changes in elevation, such as a microfluidic channel segment in a lower layer that flows into a microfluidic channel segment in a higher layer, without pinning the fluid at the transition between elevations. In some examples, these microfluidic structures can be used to make overpasses that route one fluid to cross over or under another fluid in a separate microfluidic channel. Alternatively, the microfluidic structures can simply provide a way for fluid to flow from one elevation to another elevation in a microfluidic device. Additionally, the microfluidic structures described herein can be formed using a 2.5 dimensional process as described above, in which the structures are made of multiple layers of material and the shape of features in individual layers is substantially controlled in 2 dimensions.

In order to avoid pinning of fluid in the microfluidic structures described herein, the microfluidic structures can include an interior pillar or multiple interior pillars at a transverse microfluidic channel segment. The interior pillar can have a tapered downstream edge that is angled in the first or second elevation plane at an acute angle. A fluid cross-sectional area can increase as fluid flows along the tapered downstream edge. As used herein, "fluid cross-sectional area" refers to an area of the fluid as measured on a plane that is perpendicular to the direction of fluid flow. If fluid is flowing in different directions at different locations on this plane, such as when there is turbulent flow or when the fluid is flowing around different geometry of the channel walls in different locations, then the plane can be perpendicular to the average direction of fluid flow. The "average" direction of fluid flow can be the integral of all flow vectors across the plane. The interior pillar in the transverse microfluidic channel segment can provide added surface area at the transverse microfluidic channel segment, which can be useful because the added surface area increases the overall forces of adhesion that contribute to capillary action. The tapered downstream edge can be useful because the angle of the taper makes the cross-sectional area of fluid increase gradually as the fluid flows past the angled surfaces of the taper. Since fluid pinning often occurs when the cross-sectional area increases suddenly, the tapered downstream edge can prevent pinning because the fluid cross-sectional area increases more gradually. As used herein, the statement "a fluid cross-sectional area increases in the fluid flow direction along the tapered downstream edge" refers to the fluid cross-sectional area perpendicular to the average fluid flow direction, as defined above. This cross-sectional area increases as fluid flows from the beginning of the taper toward the downstream end of the tapered edge. In other words, the taper in the interior pillar causes the interior pillar to become narrower and this provides space for the cross-sectional area of the fluid to grow as the fluid flows along the taper. It is noted that sudden decreases in the channel cross-sectional area do not cause such fluid pinning, and the microfluidic structures can include decreases in channel cross-sectional area without any gradual change.

In some examples, a microfluidic structure can include a first microfluidic channel segment in a first elevation plane and a second microfluidic channel segment in a second elevation plane. A transverse microfluidic channel segment can connect the first microfluidic channel segment to the second microfluidic channel segment. An interior pillar can be positioned at the transverse microfluidic channel segment. The interior pillar can have a tapered downstream edge. The tapered downstream edge can be angled in the first or second elevation plane at an acute angle. A fluid cross-sectional area can increase in the fluid flow direction along the tapered downstream edge.

FIG. 1 shows one example microfluidic structure 100 in accordance with the present disclosure. For clarity, a coordinate axis 102 is shown including an x-axis, y-axis, and z-axis. The microfluidic structures described herein can be oriented in any desired orientation and the orientation of the structures and components of the structures is not limited by terms such as "up" "above," "vertical," "horizontal," etc. However, for clarity in describing the microfluidic structures, the geometry of the structures is described herein in relation to the coordinate axis. Therefore, any reference to height, the vertical direction, up, down, etc., can refer to differences on the z-axis as shown in this figure. Structures that lie along the x-axis, the y-axis, or the x-y plane can be described as horizontal. As used herein, "elevation plane" refers to a plane in or parallel to the x-y plane. In other words, an elevation plane is a plane that is orthogonal to the z-axis as shown in this figure. The example shown in FIG. 1 includes a first microfluidic channel segment 110 in a first elevation plane and a second microfluidic channel segment 120 in a second elevation plane. In this example, the second microfluidic channel segment is at a higher elevation (i.e., higher on the z-axis) than the first microfluidic channel segment. When the microfluidic channel segments are referred to as being "in" an elevation plane, it is noted that the microfluidic channel segments are three-dimensional structures and thus the entire channel segment is not literally in a two-dimensional plane. Rather, this means that the microfluidic channel segment is oriented along an elevation plane and the elevation plane intersects with the channel segment at a height within the channel segment, such as anywhere between a floor of the channel segment and a ceiling of the channel segment. In some examples, the first microfluidic channel segment and the second microfluidic channel segment can be in different elevation planes, and the z-axis height and position of the first and second microfluidic channel segments can be such that the segments do not overlap at any z-axis height. In some examples, the microfluidic structures described herein can be formed from multiple stacked layers of material such as photoresist material. In these examples, the elevation planes can correspond to different layers of the material.

A transverse microfluidic channel segment 130 connects the first microfluidic channel segment 110 to the second microfluidic channel segment 120. As used herein, "transverse microfluidic channel segment" refers to a portion of the microfluidic channel that crosses the boundary between the first elevation plane and the second elevation plane. In this example, any portion of the microfluidic channel that allows fluid to flow from one elevation plane to the other is considered a part of the transverse microfluidic channel segment. The first microfluidic channel segment is considered to be the segment leading to the transverse microfluidic channel segment, and the second microfluidic channel segment is considered to be the segment following the transverse microfluidic channel segment.

The example shown in FIG. 1 includes an interior pillar 140 positioned at the transverse microfluidic channel segment 130. The interior pillar has a tapered downstream edge 142 that is angled in the second elevation plane at an acute angle 144. The tapered downstream edge is shaped so that a fluid cross-sectional area increases as the fluid flows along the tapered downstream edge. In this particular example, a portion of the interior pillar is within the transverse microfluidic channel segment, but the tapered portion at the downstream edge is within the second microfluidic channel segment. The portion of the interior pillar that is within the transverse microfluidic channel segment includes side faces 146 that are parallel to the fluid flow direction.

As used herein, when a wall segment is referred to as being "angled in" a specific plane, this refers to the angle when viewed from directly above the plane. An angle can be conceptualized as a vertex with two rays extending from the vertex. When an angle is "in" a plane, the two rays both lie in that plane. In the example described above, the angle of the tapered edge of the interior pillar is in a horizontal plane, which can be either the first elevation plane or the second elevation plane, or both, as described above. In some examples, the tapered edge of the interior pillar can be in either elevation plane or both elevation planes. The faces of the interior pillar, including the angled faces of the tapered edge, can be vertical wall segments in some examples, meaning that the wall segment extends straight up and down without being angled with respect to the z-axis. This can be due to the process used to form the layers of the microfluidic structure. As explained above, in some examples the process can allow for control over two-dimensional shapes in the layers but not control over shapes in the z-axis direction. It is noted that some processes can allow a small degree of control over the z-axis direction. For example, the wall segments can be made with slight angles, such as 15° or less, in the z-axis direction. Therefore, wall segments in the microfluidic structures described herein may not be perfectly vertical and may have such slight angles in some examples. However, the microfluidic structure designs described herein do not rely on forming angles in the z-axis direction in order to provide self-priming capillary structures.

Figure 2A:
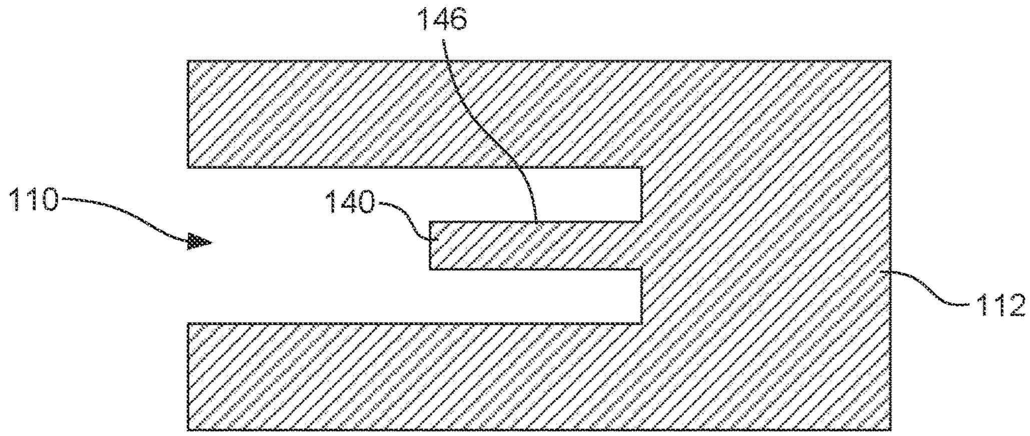
FIGS. 2A and 2B are top-down views of layers of solid material that can be stacked to form the microfluidic structure of FIG. 1.
Figure 2B:
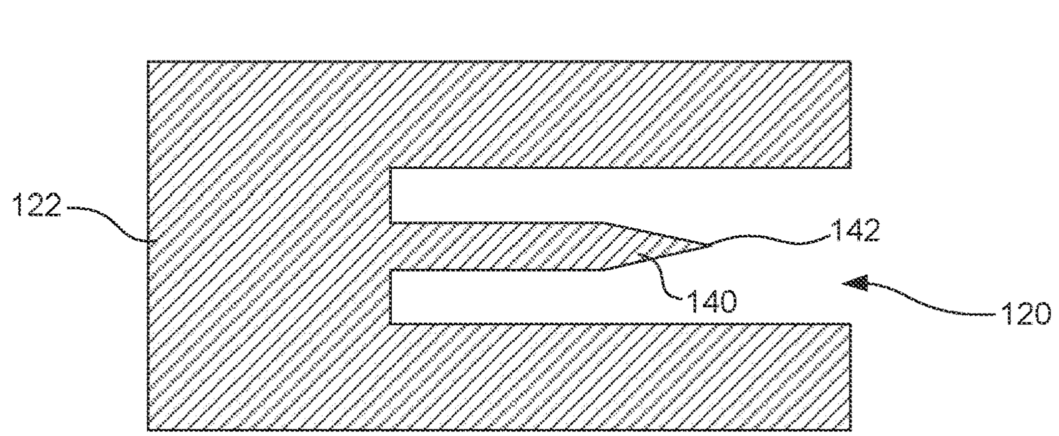

FIGS. 2A and 2B show examples of layers that can be formed using a two-dimensional patterning process and then stacked to form the microfluidic structure shown in FIG. 1. FIG. 2A shows a first layer 112 with a first microfluidic channel segment 110 formed in the first layer. An interior pillar 140 is formed in the middle of the microfluidic channel, separated from the exterior side walls of the microfluidic channel segment. As mentioned above, the interior pillar includes side faces 146 that are parallel to the direction of fluid flow. The first layer can be made of any suitable solid material, such as a photoresist material. FIG. 2B shows a second layer 122 that includes a second microfluidic channel segment 120 formed in the second layer. The interior pillar 140 is also formed in the second layer. The tapered downstream edge 142 of the interior pillar extends into the second microfluidic channel segment. The second layer can be stacked on top of the first layer to make a microfluidic structure. The area where the channels in the first and second layers overlap is the transverse microfluidic channel segment. In this example, the interior pillar has a flat face at its upstream end. However, in other examples the interior pillar may include a tapered upstream edge and a tapered downstream edge.

The acute angle of the tapered downstream edge of the interior pillar can vary depending on several factors. For a given geometry of the microfluidic structure and a given contact angle between the fluid and the solid walls of the microfluidic channels, there may exist a particular angle above which the fluid will get stuck and be pinned in the microfluidic structure. However, below this angle the fluid can continue to flow through the microfluidic structure by capillary action. This can allow the microfluidic structure to be primed by capillary action. As a guideline, the angle can be greater when a fluid with a lower contact angle is used. Conversely, the angle can be smaller when a higher contact angle fluid is used.

In some examples, the acute angle of the tapered downstream edge of the interior pillar can be from 5° to 45°. Acute angles within this range can be suitable for a variety of fluids having a variety of contact angles with the solid material of the channel walls. In some examples, the fluid can have a contact angle greater than 70° with the channel walls. In further examples, the acute angle can be from 5° to 35°, or from 5° to 25°, or from 5° to 20°, or from 10° to 20°, or from 20° to 45°, or from 30° to 45°, or from 20° to 35°. The fluid and/or the solid material of the channels walls can also vary, and the contact angle of the fluid with the channel wall material can be from 70° to 89°, or from 70° to 85°, or from 70° to 80°, or from 70° to 75°, or from 75° to 80°, or from 75° to 85°, in various examples. In some examples, the angle can be determined using the following formula. For a contact angle of $\theta$, the acute angle $\alpha$ may satisfy the condition $\alpha<2*(90°-\theta)$. For example, for a contact angle $\theta=70°$, the acute angle can be $\alpha<40°$. For a contact angle of $\theta=80°$, the acute angle can be $\alpha<20°$ The number of pillars and spacing of pillars in the microfluidic structure can also vary. In some examples, having more pillars and having the pillars spaced more closely can tend to help fluid flow past the pillars by capillary action. This may be because the pillars provide more wall surface that can exert adhesive forces on the fluid. In some examples, a fluid with a lower contact angle can flow through a microfluidic structure with few pillars and pillars spaced farther apart, whereas a fluid with a higher contact angle can be used with a structure that has more pillars and/or the pillars are spaced closer together. In various examples, a microfluidic structure can include a single pillar, or from 2 pillars to 10 pillars, or from 2 pillars to 6 pillars, or from 2 pillars to 4 pillars. The pillars can be arranged side-by-side in some examples, or staggered in other examples. The width of the pillars can vary depending on the specific geometry of a microfluidic structure. In some examples, the pillars can have a width from 2 μm to 50 μm, or from 2 μm to 30 μm, or from 2 μm to 20 μm, or from 2 μm to 10 μm, or from 4 μm to 30 μm, or from 4 μm to 20 μm, or from 4 μm to 10 μm. The pillar spacing can also be from 2 μm to 50 μm, or from 2 μm to 30 μm, or from 2 μm to 20 μm, or from 2 μm to 10 μm, or from 4 μm to 30 μm, or from 4 μm to 20 μm, or from 4 μm to 10 μm. In some examples, the total combined width of pillars present in the transverse microfluidic channel segment can be from 20% to 80% of the width of the first microfluidic channel segment leading to the transverse microfluidic channel segment. In other examples, the total combined width of the pillars can be from 20% to 60%, or 20% to 50%, or 20% to 40%, or 40% to 80%, or 40% to 60%, or 50% to 80%, of the width of the first microfluidic channel segment. Thus, fluid flowing through the first microfluidic channel segment can flow into narrower spaces between the pillars when entering the transverse microfluidic channel segment.

For a given microfluidic structure, there may be a specific number and size of pillars and a specific angle of the tapered downstream edges that separates structures that can be successfully primed using capillary action from structures that will have issues with fluid pinning. These parameters can vary depending on the contact angle of the fluid and on the specific geometry of the microfluidic channel segments in the microfluidic structure. For example, the height and width of the first and second microfluidic channel segments can affect the capillary action. The height, width, and length of the transverse microfluidic channel segment can also affect the capillary action. Mathematical formulae can provide some guidance for selecting an angle for the tapered downstream edges of the pillars. For example, the "perimeter priming rule" uses the following formula:

$$\cos\theta > \frac{P_{LG}}{P_{LW}}$$

where θ is the contact angle between the fluid and the channel wall material, $P_{LG}$ is the perimeter of the liquid-gas interface in a cross-section, and $P_{LW}$ is the perimeter of the liquid-solid interface in the cross-section. For the example of pure water in a channel made from the photoresist material SU8, the contact angle is 80°. When the equation above is solved for $P_{LW}$ in terms of $P_{LG}$ with an angle of 80°, the results is $P_{LW}=5.76P_{LG}$. In other words, the perimeter of the liquid-wall interface can be greater than 5.76 times the perimeter of the liquid-gas interface. In some cases, the "opening angle rule" can also be used, which uses the following formula:

$$\alpha<2(90°-\theta)$$

where θ is the contact angle between the fluid and the channel wall material and α is the opening angle of a single angled wall segment. Fluid will flow by capillary force through a channel that is opening to a greater width as long as the opening angle of the walls is not greater than α. If the tapered downstream edge of the pillar includes two angled wall segments that meet together at the edge, then the total angle of the tapered edge can be up to 2α. In some circumstances, these formulae may be useful as a guideline, but it can be difficult to determine the precise perimeter of liquid-wall and liquid-gas interfaces when liquid flows through a complex three-dimensional geometry. In practice, a particular geometry can be tested by physically producing the geometry and determining whether the structure can be self-primed, or by using a computer model that calculates forces of adhesion and surface tension on liquid as the liquid flows through the microfluidic structure.

Figure 3:
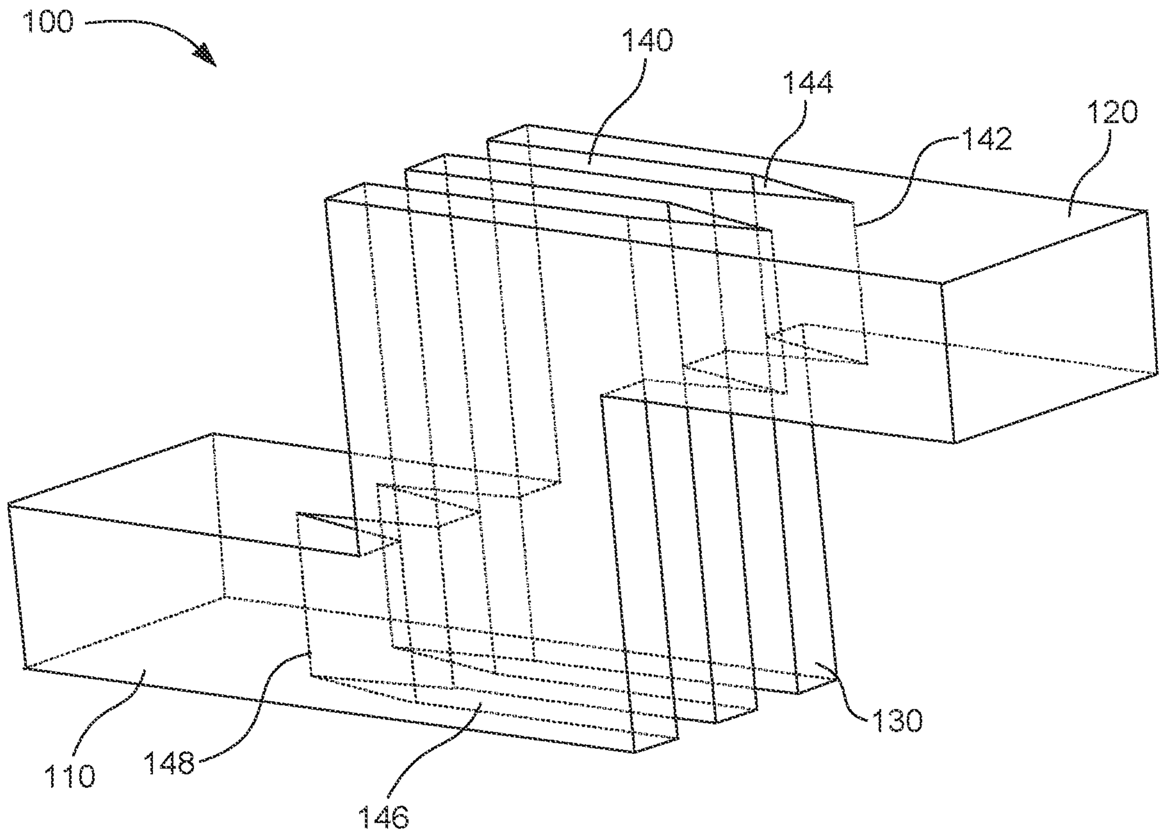
FIG. 3 is a perspective view of another example microfluidic structure in accordance with the present disclosure.

FIG. 3 shows another example microfluidic structure 100 that includes two interior pillars 140. This example also includes a first microfluidic channel segment 110 in a first elevation plane and a second microfluidic channel segment 120 in a second elevation plane. A transverse microfluidic channel segment 130 connects the first microfluidic channel segment to the second microfluidic channel segment. Two interior pillars are partially within the transverse microfluidic channel. In particular, side faces 146 of the interior pillars are within the transverse microfluidic channel. These side faces are parallel to the direction of fluid flow in the first and second microfluidic channels. The interior pillars also have tapered downstream edges 142 and tapered upstream edges 148. The tapered downstream edges extend into the second microfluidic channel segment. The tapered upstream edges extend into the first microfluidic channel segment.

Figure 4A:
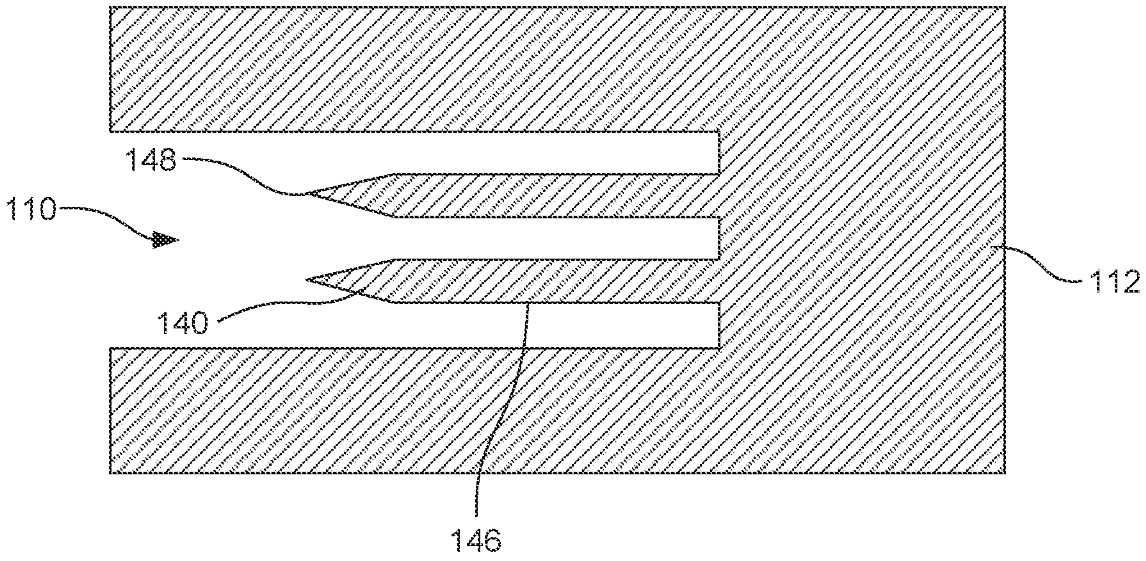
FIGS. 4A-4C are top-down views of layers of solid material that can be stacked to form the microfluidic structure of FIG. 3.
Figure 4B:
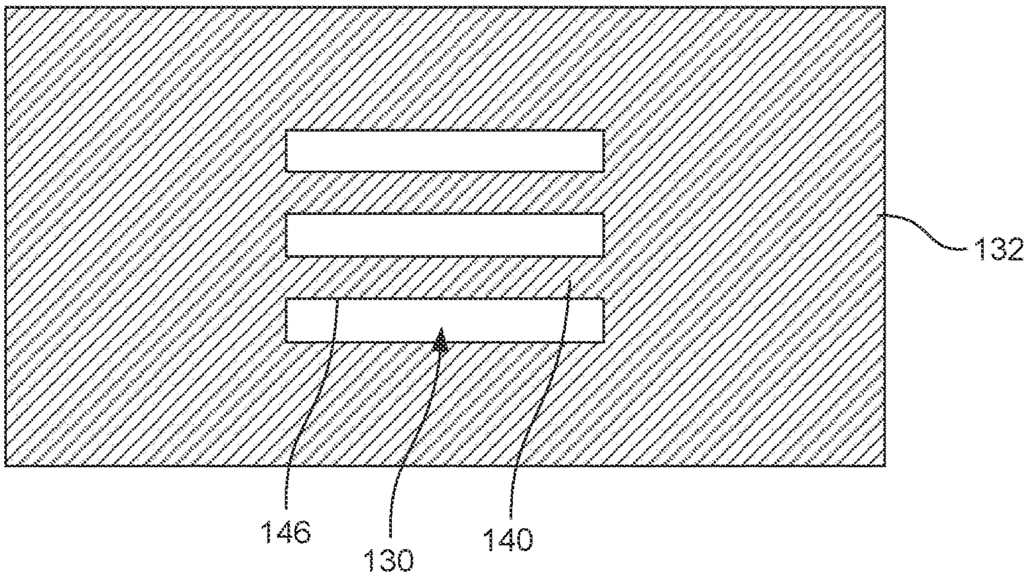
Figure 4C:
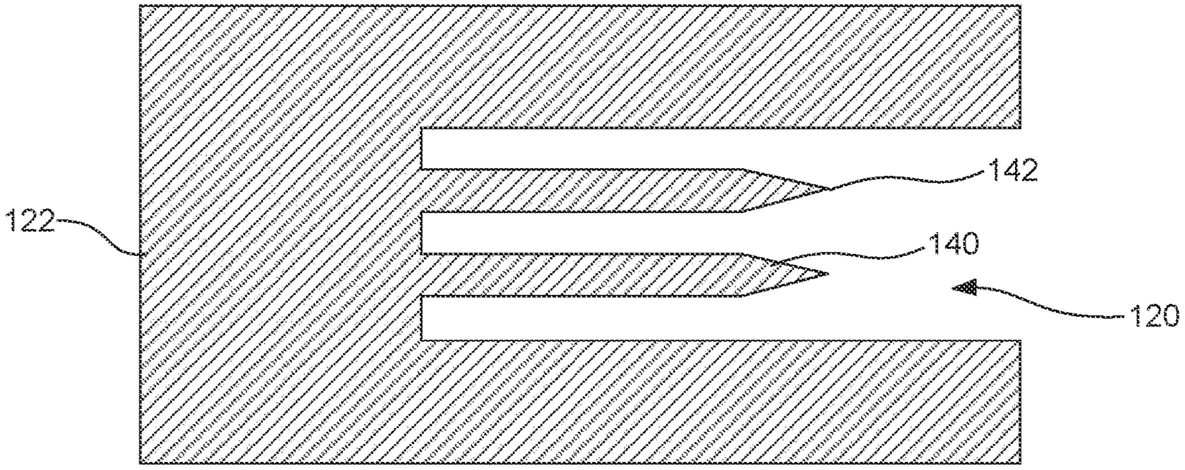

FIG. 4A shows a top-down view of a first layer of solid material 112 that can include the first microfluidic channel segment 110 formed therein. A portion of the interior pillars 140, including the tapered upstream edges 148 and the side faces 146, are also formed in the first layer. These features can be formed using a two-dimensional patterning process, such as patterning using a photomask on a photoresist material. FIG. 4B shows a top-down view of another layer, which in this example is an intermediate layer of solid material 132. This intermediate layer can be stacked on top of the first layer and under a second layer that is shown in FIG. 4C. The intermediate layer includes openings that form parts of the transverse microfluidic channel segment 130 when the layers are stacked. The central portion of the interior pillars is also formed in this layer. FIG. 4C shows a top-down view of a second layer of solid material 122 that includes a second microfluidic channel segment 120. This second layer of solid material can be stacked on top of the intermediate layer of solid material, which is stacked on the first layer of solid material, to form a microfluidic structure. When the layers are stacked, the overlapping portions of the microfluidic channel segments become a transverse microfluidic channel segment. The second layer also includes a portion of the interior pillars. The tapered downstream edge 142 is formed in the second layer of solid material.

In some examples, microfluidic structures can be formed using a first and second layer of a solid material, such as a photoresist material, as shown in FIGS. 1-2B. In further examples, an intermediate layer of solid material can be added in between the first and second layers, as shown in FIGS. 3-4C. Any number of additional layers can also be added, depending on the design of the microfluidic structure. The intermediate layer can include an opening or openings that can connect the first microfluidic channel segment in the first layer to the second microfluidic channel segment in the second layer. Thus, the opening in the intermediate layer can become a portion of the transverse microfluidic channel segment when the layers are stacked.

Additional features can also be included in the design of the microfluidic structures. In particular, features can be included that can be formed using a two-dimensional patterning process such as patterning a photoresist. In some examples, the microfluidic structures can include an angled exterior wall segment at the transverse microfluidic channel segment. This wall segment can be referred to as an "exterior" wall because it can be an outer boundary of the microfluidic channel, not an internal feature such as the interior pillars, which are spaced inward from the exterior walls. An angled exterior wall segment or multiple wall segments can be included in addition to the interior pillar or pillars in the microfluidic structures described herein.

Figure 5:
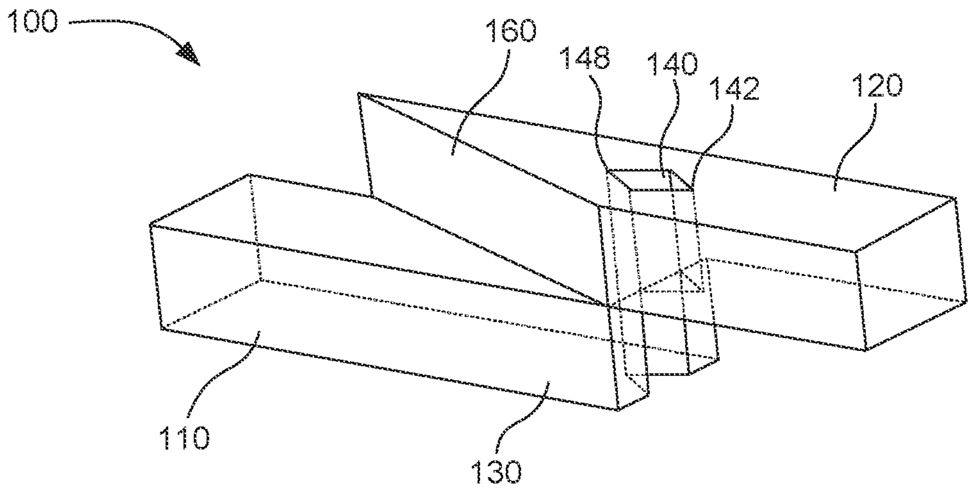
FIG. 5 is a perspective view of another example microfluidic structure in accordance with the present disclosure.

FIG. 5 is a perspective view of an example microfluidic structure 100 that includes such an angled exterior wall segment 160. The angled exterior wall segment extends from a sidewall of the transverse microfluidic channel segment 130 across to the opposite sidewall. The angle of this wall segment can be selected so that the cross section of fluid flowing past the wall segment increases in the direction of fluid flow. Additionally, the angled exterior wall segment can be angled at an acute angle with respect to the direction of fluid flow through the first microfluidic channel segment 110 or the second microfluidic channel segment 120. The acute angle can be sufficient to allow fluid to flow by capillary action through the microfluidic structure, particularly in combination with the interior pillar 140 that is also present in this example. The interior pillar in this example is a diamond-shaped pillar that extends up the transverse microfluidic channel segment and into the second microfluidic channel segment 120. The pillar includes a tapered downstream edge 142 and a tapered upstream edge 148 with acute angles, as described above.

Figure 6A:
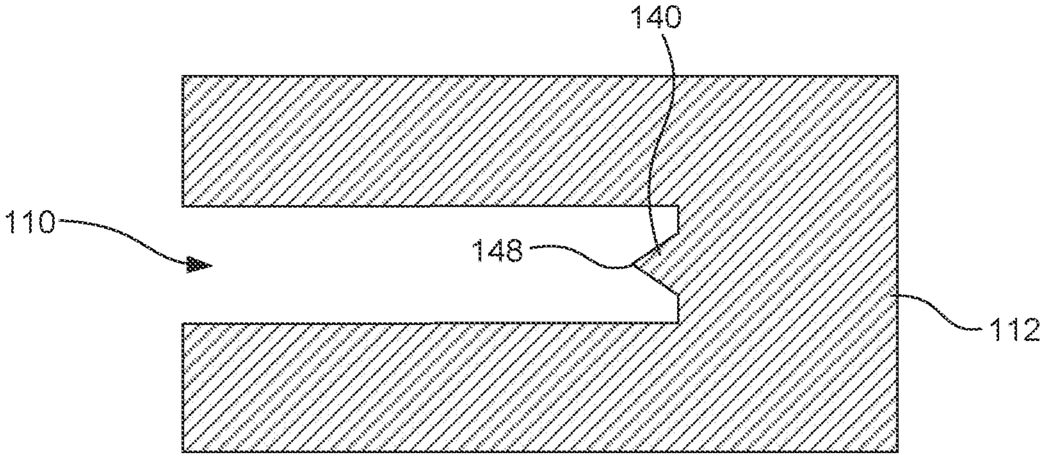
FIGS. 6A and 6B are top-down views of layers of solid material that can be stacked to form the microfluidic structure of FIG. 5.
Figure 6B:
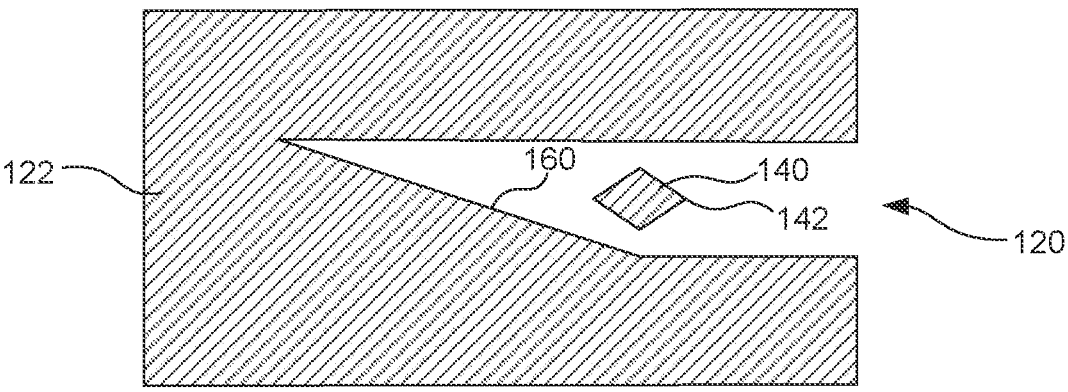

FIGS. 6A and 6B show how this example microfluidic structure can be formed from two layers of solid material. FIG. 6A shows a first layer of solid material 112 that includes the first microfluidic channel segment 110 formed therein. A portion of the interior pillar 140 and its tapered upstream edge 148 are also formed in this layer. FIG. 6B shows a second layer of solid material 122 that includes the second microfluidic channel segment 120 formed therein. Another portion of the interior pillar, including the tapered downstream edge 142, is formed in this layer. The angled exterior wall segment 160 is also formed in this layer.

In the examples described above, the first and second microfluidic channel segments have been located in different layers, for example with the first microfluidic channel segment in a first layer and the second microfluidic channel segment in a second layer that is stacked over the first layer. However, in some examples one or both of these microfluidic channel segments can occupy multiple layers. For example, the first microfluidic channel segment can be formed in a first layer of solid material, and the second microfluidic channel segment can occupy both the first layer of solid material and a second layer of solid material stacked on the first layer. In such an example, the overall shape of the microfluidic channel is a channel that starts with a small height (the first microfluidic channel segment) and then expands to have a larger height (the second microfluidic channel segment). As explained above, locations in a microfluidic structure where a cross-section of fluid increases suddenly can tend to cause fluid to become pinned. Therefore, in a structure where the first microfluidic channel segment expands into a second microfluidic channel that has a greater height, it can be useful to include an interior pillar or multiple interior pillars at the transition as described herein. In other examples, the first microfluidic channel segment can have a greater height and the second microfluidic channel segment can have a smaller height, such that the fluid cross-sectional area decreases when the fluid flows from the first channel segment into the second channel segment. Usually, reducing the cross-sectional area of the fluid does not cause pinning. However, it may be useful to include an angled exterior wall segment at such an interface in order to reduce or prevent the trapping of air bubbles.

Figure 7:
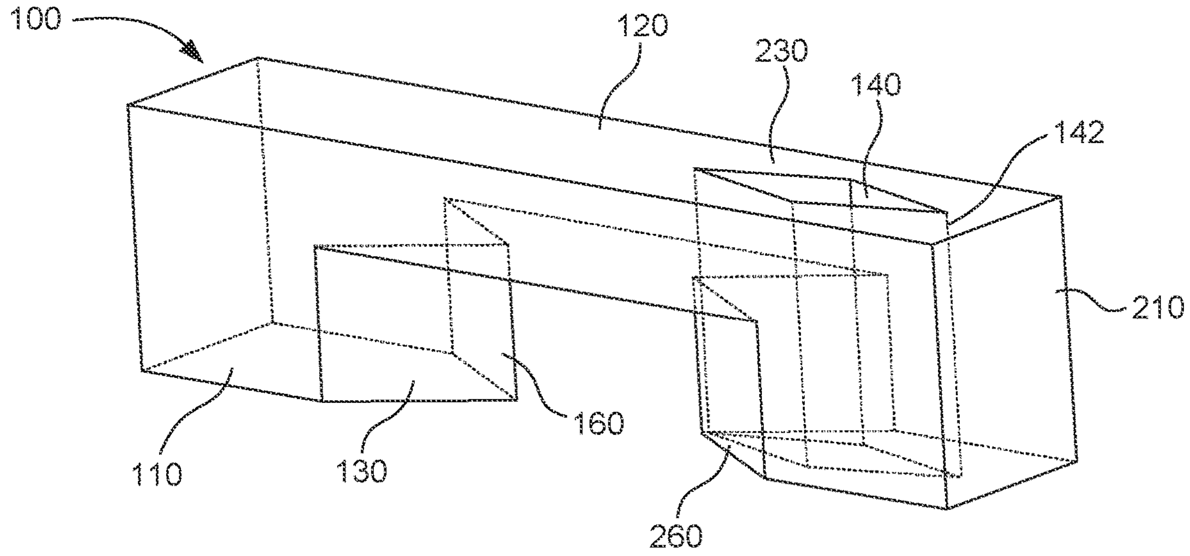
FIG. 7 is a perspective view of yet another example microfluidic structure in accordance with the present disclosure.

FIG. 7 shows an example microfluidic structure 100 that has a channel that contracts to a smaller cross-sectional area and then expands again to a larger cross-sectional area. In this example, a first microfluidic channel segment 110 is formed in two layers of solid material stacked one on top of the other. The microfluidic channel segment can be considered a "double-high" channel segment. The cross-sectional area of the fluid flowing through the channel segment is reduced when the fluid flows into a second microfluidic channel segment 120. The second microfluidic channel segment is formed in the top layer of solid material, but not the bottom layer. Two angled exterior wall segments 160 are formed in the bottom layer in a transverse microfluidic channel segment 130. In this example, the transverse microfluidic channel segment can include a portion of the channel where there is an average flow direction of fluid that has a component in the z-axis direction, as fluid flows from the taller first channel segment to the shorter second channel segment. This example also includes a third microfluidic channel segment 210 that again takes up both the upper and lower layers. Another pair of angled exterior wall segments 260 are formed in a second transverse microfluidic channel segment 230 that leads from the second microfluidic channel segment to the third microfluidic channel segment. This second transverse microfluidic channel segment also includes an interior pillar 140 that is diamond shaped, with a tapered downstream edge 142. The combination of the angled exterior wall segments and the interior pillar help fluid flow through the interface to the taller third microfluidic channel segment without fluid pinning.

Figure 8A:
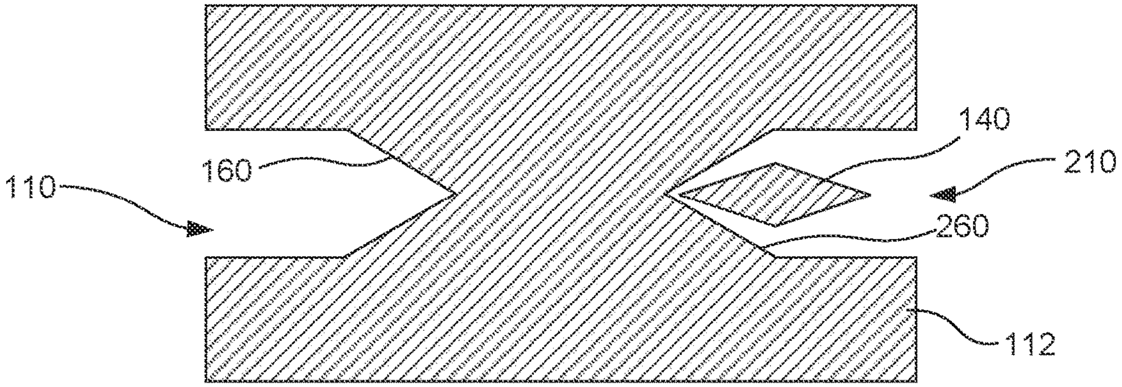
FIGS. 8A and 8B are top-down views of layers of solid material that can be stacked to form the microfluidic structure of FIG. 7.
Figure 8B:
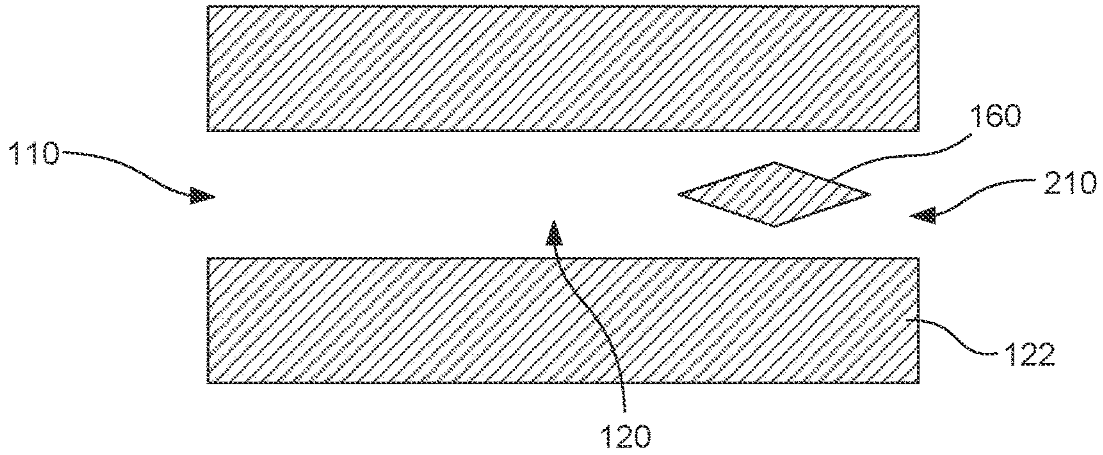

FIG. 8A shows a top-down view of an example first layer of solid material 112 that has the first microfluidic channel segment 110 and the third microfluidic channel segment 210 formed therein. The angled exterior wall segments 160, 260 and the interior pillar 140 are also formed in this first layer. FIG. 8B shows a top-down view of an example second layer of solid material 122 that can be stacked on top of the first layer to form the microfluidic structure of FIG. 7. The second layer includes a channel that forms an upper portion of the first microfluidic channel segment 110, then the second microfluidic channel segment 120, then an upper portion of the third microfluidic channel segment 210. The diamond-shaped interior pillar 140 is also formed in the second layer.

In some examples, it can be useful to form the microfluidic structures using three layers as shown in the above figures, or more than three layers. When three layers are used, the first layer can include a cross-channel formed in the first layer, separate from the first microfluidic channel segment. The cross-channel can be located such that the second microfluidic channel segment passes over the cross-channel. Thus, the second microfluidic channel segment can act as a fluidic overpass to allow two fluid streams to cross without the fluids mixing or coming into physical contact. The intermediate layer of solid material can be useful because it can separate the cross-channel from the second microfluidic channel segment. The microfluidics described here can also be used to make a fluid flow channel in some other type of structure, such as an electric wire or trace, or a sensor, or a variety of other components that may be included in a microfluidic device.

The examples described above have referred to individual layers of solid material that have various microfluidic channel segments formed therein, and the layers can be "stacked" to form the microfluidic structures. In some examples, the layers can initially be formed as individual layers of solid material and portions of the layers can be removed to form the microfluidic channel segments. The layers can then be stacked together and adhered together by curing, or by adhesive, or by fusing, or some other method. However, in other examples, the layers may not be formed as individual solid layers before being stacked together in this way. For example, a liquid photoresist material can be spread in a layer and then patterned and developed to form a solid layer having any desired microfluidic features formed therein. Another layer of liquid photoresist material can then be spread on the first layer, and the process of patterning and developing can be repeated to form additional layers. Thus, the layers can be formed one on top of another. In further examples, combinations of curable liquid material and solid material can be used. A variety of methods can be used to deposit layers of liquid photoresist material, such as spin coating, casting, spray coating, dip coating, and others.

In some examples, any of the layers of the microfluidic structures can be formed from a photoresist such as SU-8 or SU-8 2000 photoresist, which are epoxy-based negative photoresists. Specifically, SU-8 and SU-8 200 are Bisphenol A Novolac epoxy-based photoresists that are available from various sources, including MicroChem Corp. These materials can be exposed to UV light to become crosslinked, while portions that are unexposed remain soluble in a solvent and can be washed away to leave voids.

In some examples, the microfluidic structures can be formed on a substrate such as a silicon material. For example, the substrate can be formed of single crystalline silicon, polycrystalline silicon, gallium arsenide, glass, silica, ceramics or a semiconducting material. In a particular example, the substrate can have a thickness from about 500 μm to about 1200 μm.

In further examples, a primer layer can be deposited on the substrate before a first layer of solid material to form the microfluidic structures described herein. In certain examples, the primer layer can be a layer of a photoresist material, such as SU-8, with a thickness from about 2 μm to about 100 μm.

The first layer of solid material, second layer of solid material, intermediate layer of solid material, and any other layers of solid material in the microfluidic structure can be formed by exposing a layer of photoresist with a pattern of channel walls to define the microfluidic channel segments and interior pillars described above. The unexposed photoresist can then be washed away. In some examples, the layers can have a thickness from 2 μm to 100 μm. Thus, the microfluidic channel segments can have a height from 2 μm to 100 μm. In further examples, the microfluidic channel segments can have a height from 6 μm to 60 μm, or from 10 μm to 50 μm, or from 14 μm to 40 μm. The microfluidic channel segments can be formed having a width from about 2 μm to about 100 μm, from about 10 μm to about 50 μm, or from about 14 μm to about 40 μm.

In certain examples, layers of the microfluidic structures can be formed by laminating a dry film photoresist over the layer below and then exposing the dry film photoresist with a UV pattern defining any microfluidic features to be formed in that layer. In further examples, an additional ceiling or cap layer can be laminated over the top of the second layer, forming a ceiling for the second microfluidic channel segment described in the examples above.

Microfluidic Overpasses

The present disclosure also discloses microfluidic overpasses. These are also microfluidic structures that can include a first microfluidic channel segment in a first elevation plane and a second microfluidic channel segment in a second elevation plane connected by a transverse microfluidic channel segment as in the previous examples. The structure can include an interior pillar partially within the transverse microfluidic channel segment. The interior pillar can have a tapered downstream edge with an acute angle. The microfluidic overpasses can also include a microfluidic cross-channel that is fluidly separate from the first microfluidic channel segment and the second microfluidic channel segment and the transverse microfluidic channel segment. As used herein, "fluidly separate" means that fluid in the cross-channel is isolated from fluid in the first microfluidic channel segment, transverse microfluidic channel segment, and second microfluidic channel segment. Therefore, two fluids can flow through the overpass without mixing. The cross-channel can cross the first microfluidic channel segment in the second elevation plane, or the cross-channel can cross the second microfluidic channel segment in the first elevation plane.

As mentioned above, in some examples the first microfluidic channel segment is formed in a first layer of solid material and the second microfluidic channel is formed in a second layer of solid material. In further examples, the microfluidic cross-channel can be formed in one of the layers of solid material. For example, the cross-channel can be formed in the first layer of solid material as an additional channel formed in addition to the first microfluidic channel segment. These channel segments can be formed so that they are separated one from another by the solid material. The cross-channel can be oriented so that it crosses under the second microfluidic channel segment when a second layer of solid material is stacked on top having the second microfluidic channel segment formed therein. The cross-channel can be isolated from the second microfluidic channel segment by a barrier such as an intermediate layer of solid material placed between the first layer and the second layer.

The microfluidic overpasses described herein can lead a fluid to flow from a first microfluidic channel segment in a first elevation plane, up through a transverse microfluidic channel segment to a second microfluidic channel segment in a second elevation plane. The fluid can then pass over a microfluidic cross-channel that is in the first elevation plane. In some examples, the second microfluidic channel segment can connect to a second transverse microfluidic channel segment, which can lead back down to a third microfluidic channel segment in the first elevation plane. Thus, the microfluidic overpass can allow fluid to flow up and over a cross-channel, and then back down to the first elevation plane again. Additionally, an interior pillar or multiple interior pillars can be positioned at both transverse microfluidic channel segments or at one of the transverse microfluidic channel segments to prevent pinning of fluid and allow the fluid to flow by capillary action through the overpass.

Figure 9:
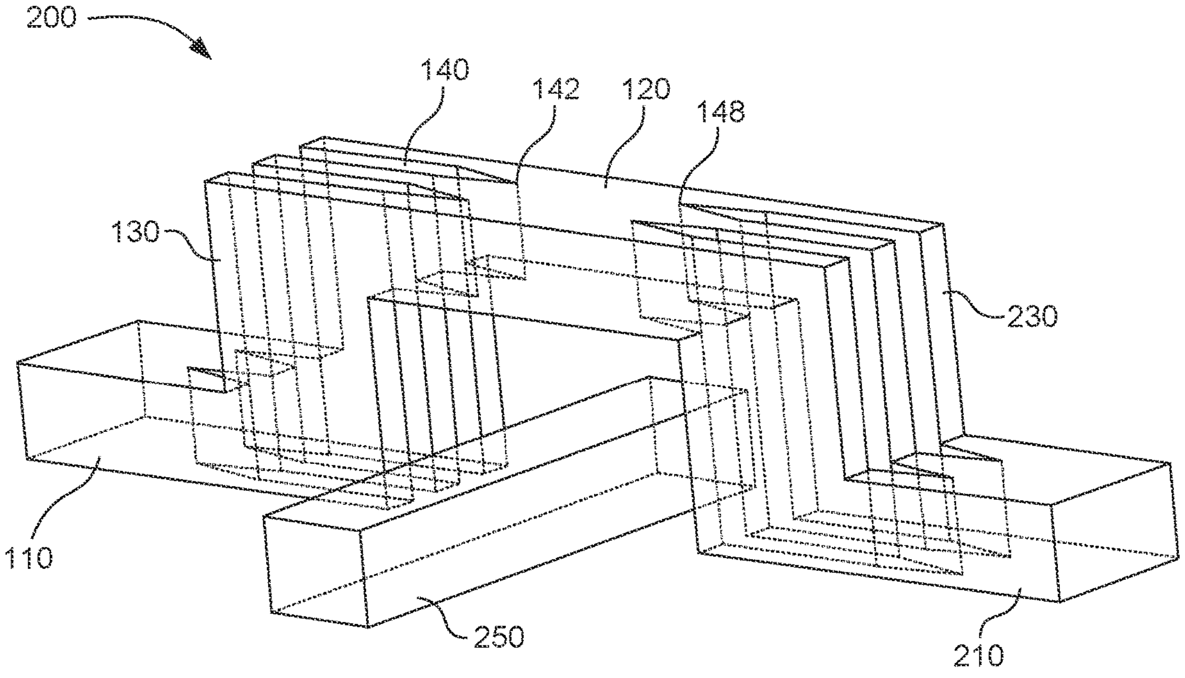
FIG. 9 is a perspective view of an example microfluidic overpass in accordance with the present disclosure.

FIG. 9 shows a perspective view of an example of a microfluidic overpass 200 that routes a fluid up and over a microfluidic cross-channel 250 and then routes the fluid back down again in this way. The microfluidic overpass includes a first microfluidic channel segment 110, a second microfluidic channel segment 120, a third microfluidic channel segment 210, a first transverse microfluidic channel segment 130, and a second transverse microfluidic channel segment 230. The first transverse microfluidic channel segment routes fluid from the first microfluidic channel segment up to the second microfluidic channel segment. The second transverse microfluidic channel segment routes the fluid from the second microfluidic channel segment down to the third microfluidic channel segment. The overpass also includes several interior pillars 140. Two interior pillars are positioned partially within the first transverse microfluidic channel segment, and two interior pillars are positioned partially within the second transverse microfluidic channel segment. The pillars include a tapered downstream edge 142 and a tapered upstream edge 148. The angle of the tapered downstream edges of the pillars allows fluid to increase gradually in the cross-section as the fluid flows past the downstream edges of the pillars.

Figure 10:
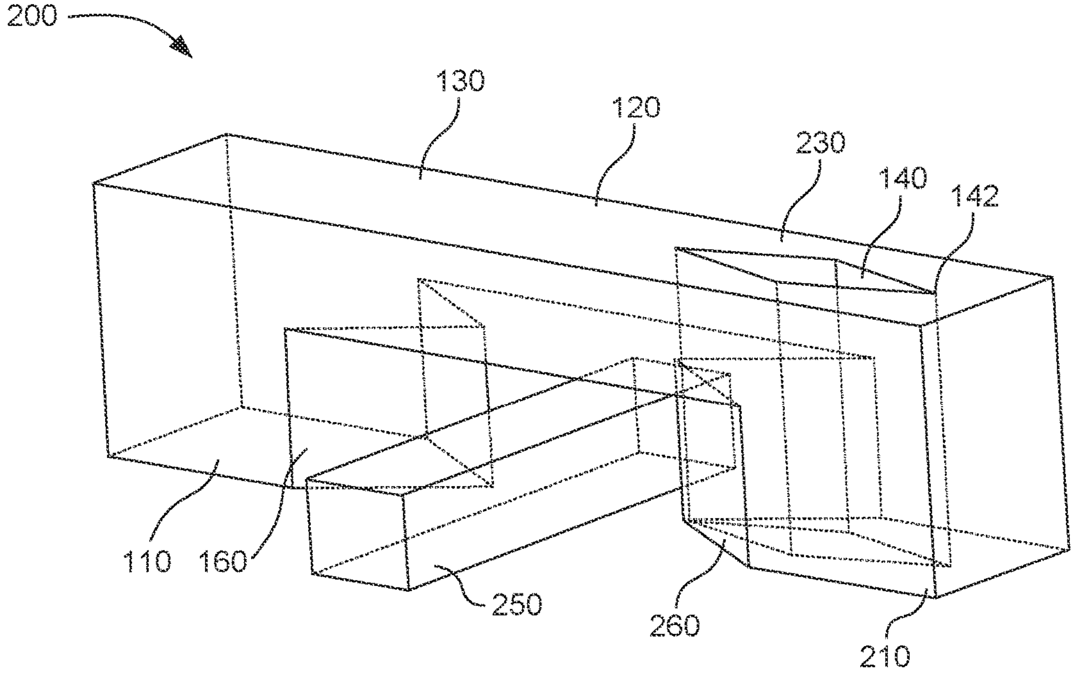
FIG. 10 is a perspective view of another example microfluidic overpass in accordance with the present disclosure.

FIG. 10 shows a perspective view of another example microfluidic overpass 200. This example also includes a first microfluidic channel segment 110, a second microfluidic channel segment 120, and a third microfluidic channel segment 210. A first transverse microfluidic channel segment 130 connects the first channel segment to the second channel segment. A second transverse microfluidic channel segment 230 connects the second channel segment to the third channel segment. This example can be formed from three layers of solid material stacked one on another. The first microfluidic channel segment and the third microfluidic channel segment are taper than the second microfluidic channel segment in this example. If the structure is formed from three layers of material, then the first and third microfluidic channel segments occupy all three layers, whereas the second microfluidic channel segment occupies the top layer. In this example, the first transverse microfluidic channel segment includes angled wall segments 160 within the transverse microfluidic channel segment. The first transverse channel segment can be defined as the portion of the microfluidic channel where these angled wall segments are present. These angled wall segments can help the channel to be primed with fluid without trapping air bubbles in the first transverse microfluidic channel segment. The second transverse microfluidic channel segment 230 includes a second pair of angled wall segments 260 and an interior pillar 140. The interior pillar is diamond shaped, with a tapered downstream edge 142. In this example, the second transverse channel segment can be defined as the portion of the channel beginning (with respect to the direction of fluid flow) at the second pair of angled wall segments and ending at the tapered downstream edge of the interior pillar. As in the previous example, a microfluidic cross-channel 250 crosses under the second microfluidic channel segment 120.

Figure 11:
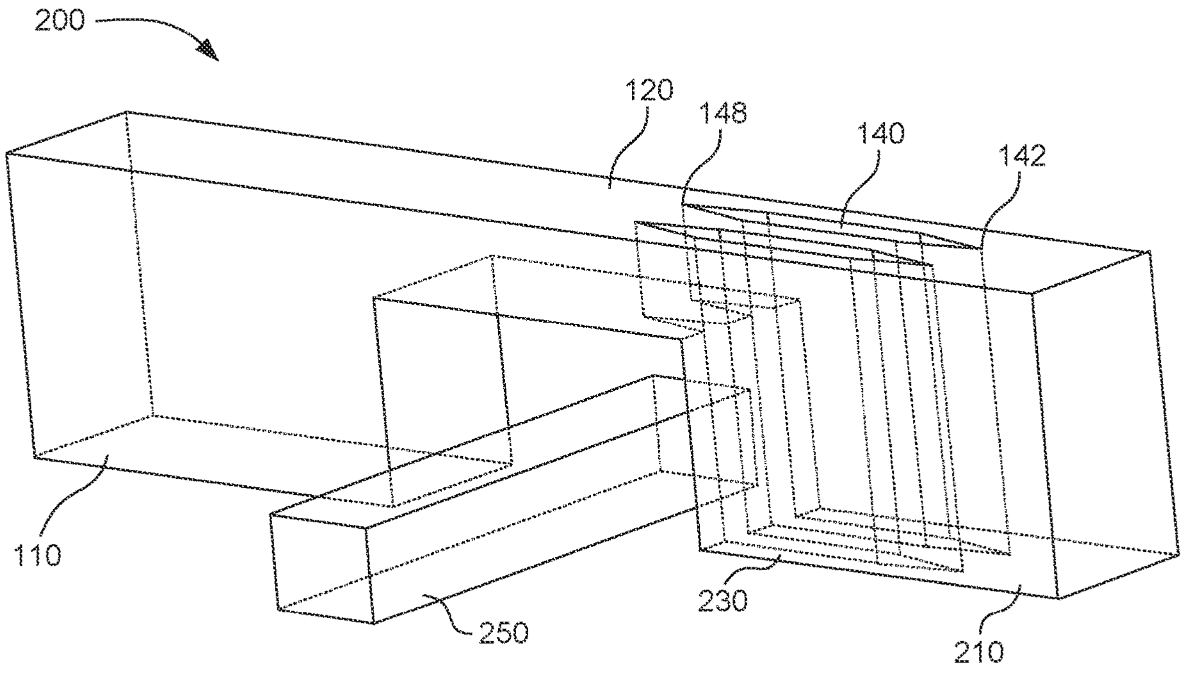
FIG. 11 is a perspective view of yet another example microfluidic overpass in accordance with the present disclosure.

FIG. 11 is a perspective view of another example microfluidic overpass 200. This example is similar to FIG. 9, except that the first microfluidic channel segment 110 and the third microfluidic channel segment 210 are "full-height" channel segments, meaning that the height of these channel segments occupies all three layers. There are no interior pillars at the transition from the first microfluidic channel segment to the second microfluidic channel segment 120 because the cross-sectional area of the channel decreases at this transition. Therefore, fluid can continue to flow by capillary action from the larger cross-section of the first channel segment into the smaller cross-section of the second channel segment. However, two interior pillars 140 are included at the transition from the second channel segment to the third channel segment, because the cross-sectional area increases at this transition. The interior pillars include a tapered downstream edge 142 and a tapered upstream edge 148. In this example, the transverse microfluidic channel segment 230 can be defined as the portion of the channel after the transition from the second microfluidic channel segment having the smaller cross-section back to the "full-height" and where the interior pillars are located. The transverse microfluidic channel segment can end and the third microfluidic channel segment can begin at the tapered downstream edge of the interior pillars. Although the third microfluidic channel segment overlaps with the second microfluidic channel segment on the z-axis, the third microfluidic channel segment is still said to be in a lower elevation plane because the third channel segment extends lower on the z-axis and therefore intersects with lower elevation planes than the second microfluidic channel segment. This example also includes a cross-channel 250 crossing under the overpass.

Methods of Priming a Microfluidic Structure

Figure 12:
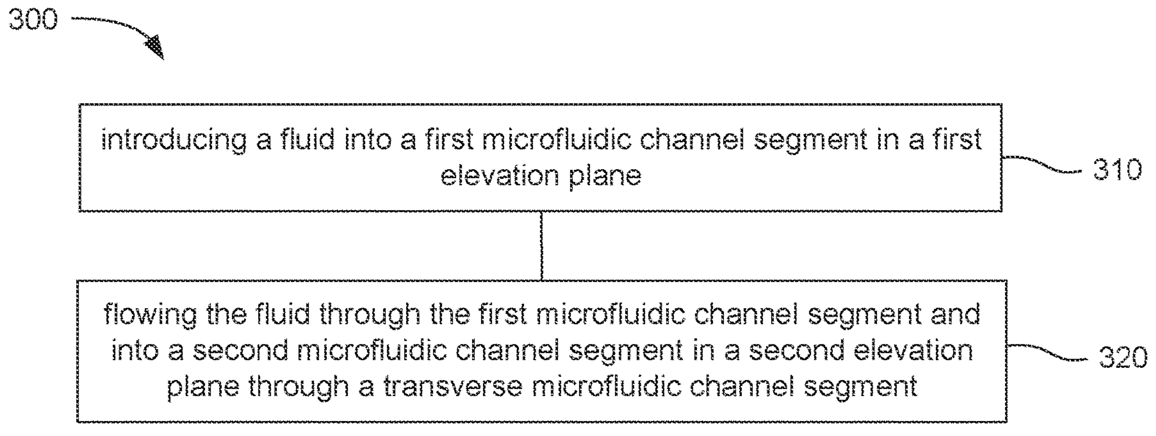
FIG. 12 is a flowchart illustrating a method of priming a microfluidic structure in accordance with the present disclosure.

The present disclosure also described methods of priming a microfluidic structure. The microfluidic structure can have any of the features of the microfluidic structures described herein. FIG. 12 is a flowchart illustrating an example method of priming a microfluidic structure 300. This method includes: introducing 310 a fluid into a first microfluidic channel segment in a first elevation plane; and flowing 320 the fluid through the first microfluidic channel segment and into a second microfluidic channel segment in a second elevation plane through a transverse microfluidic channel segment connecting the first microfluidic channel segment to the second microfluidic channel segment, wherein the flowing is by capillary action; wherein an interior pillar is positioned at the transverse microfluidic channel segment, the interior pillar having a tapered downstream edge, wherein the tapered downstream edge is angled in the first or second elevation plane at an acute angle.

As mentioned above, the microfluidic structures described herein can be particularly useful when used with a high-contact-angle fluid. In some examples, the fluid that is used to prime the microfluidic structure can have a contact angle of 70° or greater than the material of the microfluidic channel walls. Some example fluids that may have a high contact angle include pure water, reagents, biological components such as dispersions of live cells, surfactant-free dispersions, and others.

It is to be understood that this disclosure is not limited to the particular processes and materials disclosed herein because such processes and materials may vary somewhat. It is also to be understood that the terminology used herein is used for the purpose of describing particular examples. The terms are not intended to be limiting because the scope of the present disclosure is intended to be limited by the appended claims and equivalents thereof, It is noted that, as used in this specification and the appended claims, the singular forms "a," "an," and "the" include plural referents unless the context clearly dictates otherwise.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list are individually identified as a separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if the numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

Microfluidic Overpass with Multiple Interior Pillars

A three-dimensional computer model was prepared of a microfluidic overpass having the design shown in FIG. 9. In this specific design, the first microfluidic channel segment, the second microfluidic channel segment, and the third microfluidic channel segment had a width of 25 μm and a height of 14 μm. Vertical spacing between the first microfluidic channel segment and the second microfluidic channel segment was 17 μm. Thus, the total height of the transverse microfluidic channel segments was 14 μm+17 μm+14 μm=45 μm. The design included two interior pillars placed side by side in the first transverse microfluidic channel segment and two more interior pillars placed side by side in the second transverse microfluidic channel segment. The interior pillars had a width of 5 μm, and the pillars were spaced apart by 5 μm one from another and 5 μm from the exterior side walls of the channel segment. The pillars included a central portion that was within the transverse microfluidic channel segment, and the central portion had flat side surfaces that were parallel to the direction of fluid flow. The length of this central portion was 30 μm (in the x-axis direction). The pillars also included a tapered downstream edge that extended downstream from the transverse channel segment and a tapered upstream edge that extended upstream from the transverse channel segment. The tapered edges had an acute angle of 20°.

The three-dimensional model of the microfluidic overpass was used to run a simulation of a liquid having a contact angle of 80° flowing through the microfluidic overpass with no force applied to the liquid except for the forces of adhesion with the channel walls and the force of surface tension at the liquid/air interface. The simulation also modeled momentum of the liquid. The result of the simulation was that the liquid successfully primed the entire microfluidic overpass by capillary action.

Microfluidic Overpass with a Diamond-shaped Interior Pillar

A three-dimensional computer model was prepared of a microfluidic overpass having the design shown in FIG. 10. In this design, the first microfluidic channel segment and the third microfluidic channel segment were taller in the z-axis direction than the second microfluidic channel segment. The first and third microfluidic channel segments had a height of 34 μm, while the second microfluidic channel segment had a height of 14 μm. The first, second, and third microfluidic channel segments had the same width of 25 μm. A first pair of angled exterior wall segments was positioned at the first transverse microfluidic channel segment and a second pair of angled exterior wall segments was positioned at the second transverse microfluidic channel segment. The individual angled exterior wall segments were angled at 32° with respect to the direction of fluid flow through the first microfluidic channel segment. A diamond-shaped interior pillar was positioned in the second transverse microfluidic channel segment. The diamond-shaped pillar had a tapered upstream edge and a tapered downstream edge, both having an angle of 30°.

A simulation was run to simulate flowing a liquid having a contact angle of 80° through this microfluidic overpass. The simulation modeled the forces of adhesion and surface tension as in the previous example. The simulated liquid successfully primed the entire microfluidic overpass by capillary action in this simulation.

Comparative Microfluidic Overpass

A three-dimensional model of a comparative microfluidic overpass was prepared. The design of the comparative microfluidic overpass did not include any interior pillars or angled exterior wall segments as described herein. Instead, the comparative overpass had 90° angles, with the first microfluidic channel segment turning sharply at a 90° angle up through a vertical transverse channel segment having a rectangular cross section. The transverse microfluidic channel segment then turned sharply at another 90° angle into the second microfluidic channel segment. The second microfluidic channel led to a similar second transverse microfluidic channel segment and a third microfluidic channel segment through sharp 90° angles.

The same simulation was run with this design as in the previous two examples. In this simulation, the liquid having an 80° contact angle flowed by capillary action through the first microfluidic channel segment until the liquid reached the 90° turn into the transverse channel segment. Because of the sudden increase in cross-sectional area of the fluid as the fluid started filling this 90° corner, the surface tension force stopped the flow of the fluid and the fluid became pinned before the 90° bend.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A microfluidic structure, comprising:

a first microfluidic channel segment in a first elevation plane;

a second microfluidic channel segment in a second elevation plane;

a transverse microfluidic channel segment connecting the first microfluidic channel segment to the second microfluidic channel segment;

an interior pillar positioned at the transverse microfluidic channel segment, the interior pillar comprising a central portion extending through the transverse microfluidic channel segment, a tapered upstream edge extending from the central portion into the first microfluidic channel in the first elevation plane, and a tapered downstream edge extending from the central portion into the second microfluidic channel in the second elevation plane, wherein the tapered downstream edge in the second elevation plane is angled in the second elevation plane at an acute angle and is tapering in a direction opposite the tapered upstream edge in the first elevation plane, and wherein a fluid cross-sectional area increases in a fluid flow direction along the tapered downstream edge; and a microfluidic cross-channel that is fluidly separate from the first microfluidic channel segment, the second microfluidic channel segment, and the transverse microfluidic channel segment, wherein the microfluidic cross-channel either crosses the first microfluidic channel segment in the second elevation plane, or crosses the second microfluidic channel segment in the first elevation plane.

2. The microfluidic structure of claim 1, wherein the central portion comprises side faces that are parallel to the fluid flow direction.

3. The microfluidic structure of claim 1, wherein the interior pillar is diamond shaped.

4. The microfluidic structure of claim 1, wherein the acute angle is from 5° to 45°.

5. The microfluidic structure of claim 1, wherein the first microfluidic channel segment is formed in a first layer of photoresist material in the first elevation plane and the second microfluidic channel segment is formed in a second layer of photoresist material in the second elevation plane.

6. The microfluidic structure of claim 5, further comprising an intermediate layer of photoresist material between the first layer of photoresist material and the second layer of photoresist material, wherein a portion of the transverse microfluidic channel segment is formed in the intermediate layer of photoresist material.

7. The microfluidic structure of claim 1, further comprising an angled exterior wall segment at the transverse microfluidic channel segment, wherein the angled exterior wall segment is angled in the first or second elevation plane at an acute angle with respect to the fluid flow direction through the first or second microfluidic channel segment.

8. A microfluidic overpass, comprising:

a first microfluidic channel segment in a first elevation plane;

a second microfluidic channel segment in a second elevation plane;

a transverse microfluidic channel segment connecting the first microfluidic channel segment to the second microfluidic channel segment;

an interior pillar positioned at the transverse microfluidic channel segment, the interior pillar comprising a central portion extending through the transverse microfluidic channel segment, a tapered upstream edge extending from the central portion into the first microfluidic channel in the first elevation plane, and a tapered downstream edge extending from the central portion into the second microfluidic channel in the second elevation plane, wherein the tapered downstream edge in the second elevation plane is angled in the second elevation plane at an acute angle and is tapering in a direction opposite the tapered upstream edge in the first elevation plane; and a microfluidic cross-channel that is fluidly separate from the first microfluidic channel segment, the second microfluidic channel segment, and the transverse microfluidic channel segment, wherein the microfluidic cross-channel either crosses the first microfluidic channel segment in the second elevation plane, or crosses the second microfluidic channel segment in the first elevation plane.

9. The microfluidic overpass of claim 8, wherein the first microfluidic channel segment is formed in a first layer of photoresist material in the first elevation plane and the second microfluidic channel segment is formed in a second layer of photoresist material in the second elevation plane, and wherein the microfluidic cross-channel is formed in the first layer of photoresist material or the second layer of photoresist material.

10. The microfluidic overpass of claim 9, further comprising an intermediate layer of photoresist material between the first layer of photoresist material and the second layer of photoresist material, wherein a portion of the transverse microfluidic channel segment is formed in the intermediate layer of photoresist material, and wherein the intermediate layer of photoresist material fluidly separates the microfluidic cross-channel from the channel segment that is crossed by the microfluidic cross-channel.

* * * * *